United States Patent
Napolitano

(10) Patent No.: US 7,530,334 B1
(45) Date of Patent: May 12, 2009

(54) SHOCK ABSORBER FOR ATTACHMENT TO A DOG LEASH

(76) Inventor: Dennis Napolitano, 780 Van Buren, Unit G, Placentia, CA (US) 92870

( * ) Notice: Subject to any disclaimer, the term of this patent is extended or adjusted under 35 U.S.C. 154(b) by 0 days.

(21) Appl. No.: 12/009,048

(22) Filed: Jan. 16, 2008

Related U.S. Application Data

(63) Continuation-in-part of application No. 11/541,595, filed on Oct. 2, 2006, now abandoned, and a continuation-in-part of application No. 11/097,845, filed on Apr. 4, 2005, now abandoned.

(51) Int. Cl.
*A01K 27/00* (2006.01)
(52) U.S. Cl. .................... 119/798; 119/795; 119/769
(58) Field of Classification Search ................ 119/769, 119/770, 786, 788, 792, 795, 797, 798
See application file for complete search history.

(56) References Cited

U.S. PATENT DOCUMENTS

| | | | | |
|---|---|---|---|---|
| 197,615 A * | 11/1877 | Dawson | ...................... | 267/70 |
| 198,275 A * | 12/1877 | Chase | ...................... | 267/70 |
| 373,097 A * | 11/1887 | Russwurm | ...................... | 54/6.1 |
| 913,680 A * | 3/1909 | Belcher | ...................... | 267/71 |
| 2,593,940 A * | 4/1952 | Van Meter | ...................... | 119/799 |
| 2,737,154 A * | 3/1956 | Michonski | ...................... | 119/798 |
| 2,761,266 A * | 9/1956 | Hobkirk | ...................... | 54/71 |
| 4,111,407 A * | 9/1978 | Stager | ...................... | 267/166.1 |
| 4,488,511 A * | 12/1984 | Grassano | ...................... | 119/798 |
| 4,627,375 A * | 12/1986 | Davis et al. | ............ | 114/230.18 |
| 5,092,276 A * | 3/1992 | Rockhold | ...................... | 119/819 |
| 5,482,258 A * | 1/1996 | Clauson et al. | ................ | 267/71 |
| 5,706,764 A * | 1/1998 | Irbinskas | ...................... | 119/792 |
| 6,006,699 A * | 12/1999 | Keever | ...................... | 119/795 |

FOREIGN PATENT DOCUMENTS

JP 09009814 A * 1/1997

OTHER PUBLICATIONS

Machine translation of JP09009814A.*

* cited by examiner

*Primary Examiner*—Son T. Nguyen
(74) *Attorney, Agent, or Firm*—Allen A. Dicke, Jr.

(57) ABSTRACT

The body of the shock absorber is made of lightweight flexible resilient tubular polymer material which will not cause injury when struck by it. The body has a stop in each end and two compression springs within the tubular body between the stops. Tension cables are attached to the compression springs and do not pneumatically engage within the tubular polymer body and extend out of the body and respectively carry a snap hook for attachment to a dog collar and a ring for attachment to a dog leash. Pull on the tension members causes compression of the springs to reduce shock-loading on the dog walker. After the springs are pulled solid, the resiliency of the body continues to absorb shock.

12 Claims, 3 Drawing Sheets

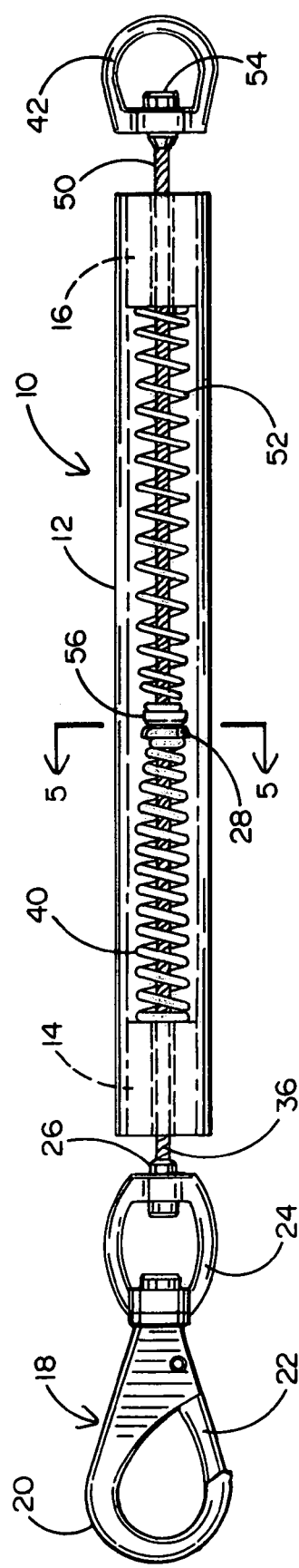
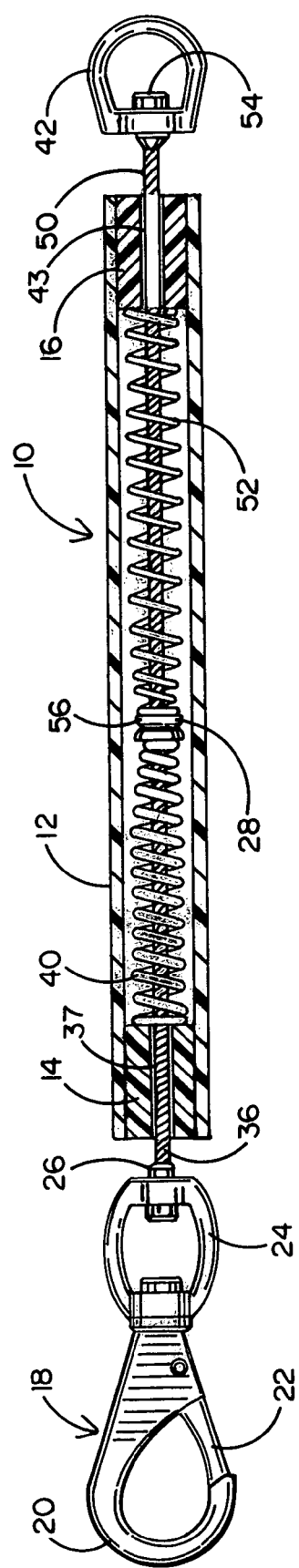

US 7,530,334 B1

SHOCK ABSORBER FOR ATTACHMENT TO A DOG LEASH

CROSS REFERENCE

This application relies on my earlier filed applications, Ser. No. 60/650,387, filed Feb. 4, 2005, Ser. No. 11/097,845, filed Apr. 4, 2005, and Ser. No. 11/541,595, filed Oct. 2, 2006, for priority, the entire disclosures of which are incorporated herein by this reference.

BACKGROUND OF THE INVENTION

In urban environments, dogs are required to be leashed when they are outside their own home fence limits. Dogs usually wear a collar at all times. These collars carry the dog license and sometimes the dog's separate identification. The collar also has an eye thereon which can be engaged by a leash. Dogs are often taken for a walk while controlled by a leash.

The leash is carried in the walker's hands and is snapped to the eye in the dog's collar. Sometimes the dog is large and the dog walker is small. When a dog becomes excited, for example, chasing a squirrel, uncomfortable and sometimes damaging shock can be transferred through the leash to the dog walker. In order to protect the dog walker's arm against damage, a shock absorber which can be installed between the leash and the dog collar is desirable.

SUMMARY OF THE INVENTION

In order to aid in the understanding of this invention, it can be stated in essentially summary form that it is directed to a shock absorber for attachment to a dog leash. The shock absorber is comprised of a flexible tubular body having a spring therein. The spring is preferably a spiral compression spring with the body configured so that spring failure is in the safe mode. One end of the body carries a snap hook for engaging in the eye of the dog collar and the other end has a ring for engagement by the snap hook on a conventional leash so that the shock absorber can be installed between the collar and the leash.

It is, thus, a purpose and advantage of this invention to provide a shock absorber for a dog leash wherein the shock absorber is positioned between the dog collar and leash so that it reduces the shocks transmitted by the dog to the dog walker.

It is another purpose and advantage of this invention to provide a shock absorber constructed with a body of flexible tube and with at least one compression spring therein. The compression spring is mounted in the body in a manner that, if the spring fails, the shock absorber will not come apart.

It is another purpose and advantage of this invention to provide a shock absorber which is small in size and light in weight so it can be easily used, and which can be readily manufactured so as to be widely available.

It is another purpose and advantage of this invention to provide a shock absorber which has a snap hook on one end configured to snap into the eye in a dog collar and which has a loop on the other end configured to be engaged by the snap hook on a dog leash so that it can be readily inserted between existing collars and dog leashes.

Other purposes and advantages of this invention will become apparent from a study of the following portion of the specification and the following drawings.

BRIEF DESCRIPTION OF THE DRAWINGS

FIG. 2 is a side-elevational view of the shock absorber in the unstressed condition which, in this case, has a transparent body so that the interior structure can be seen.

FIG. 3 is a longitudinal section thereof, with parts broken away and parts taken in section.

DESCRIPTION OF THE PREFERRED EMBODIMENTS

Figure 1:
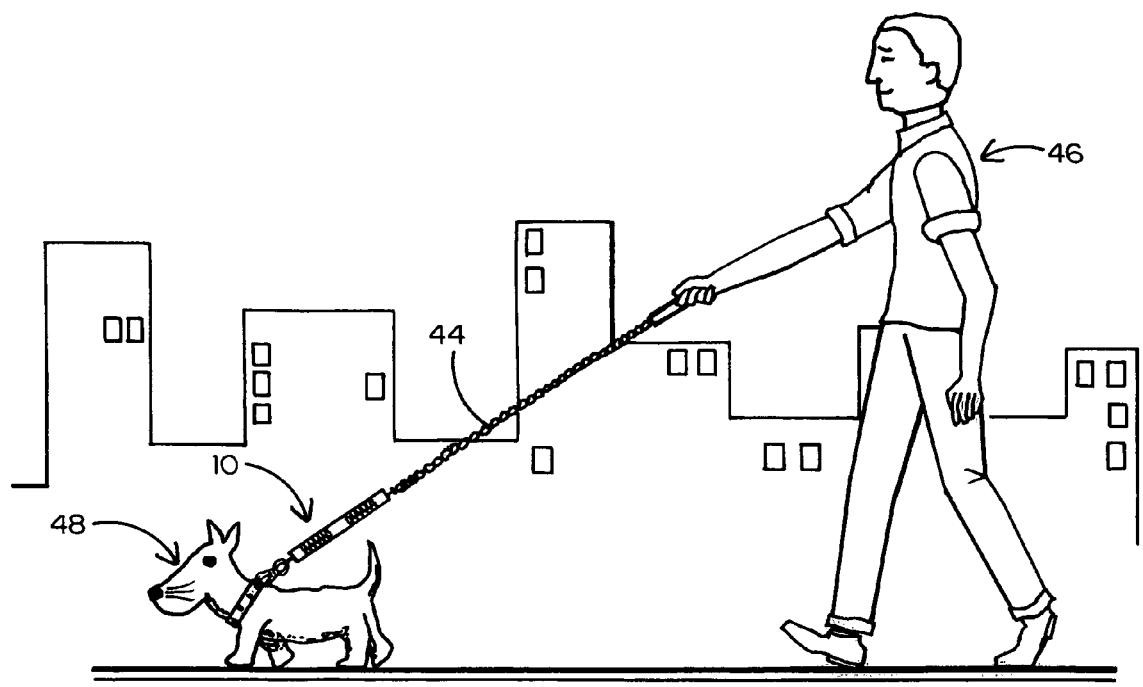
FIG. 1 is a side-elevational view of the shock absorber for a dog leash in accordance with this invention utilized between a dog and a dog walker.

The shock absorber of this invention is particularly suitable for dogs when on a leash, but is also suitable for other animals in other circumstances. The shock absorber is generally indicated at 10 in FIGS. 1, 2, 3, and 4. The body 12 of the shock absorber is a tubular structure and is made of synthetic polymer composition material. In FIG. 2, the body is shown as being made of clear synthetic polymer composition material so that the internal structure is visible, but in commercial production is preferably of opaque material. The material of the body is flexible and resilient. For the purposes of this invention, flexible is defined as having a modulus of elasticity E not greater than about $2 \times 10^3$. Stiffness greater than that value is not desired or helpful. The modulus of elasticity E is the ratio of the increment of unit stress to increment of deformation within the elastic limit. The material of the body is sufficiently resilient so that its elasticity is no more than $2 \times 10^3$ in the foot pound second system. The strength and resiliency is such that it can be stretched to 150% of its unstressed length. It is a cylindrical tube of substantially uniform wall thickness and substantially uniform diameter such as is achieved by extrusion. The synthetic polymer composition material of the body is sufficiently flexible and resilient so that it does not hurt when the user is inadvertently struck by the tubular body. In addition, it is resilient and of low enough spring constant so that it stretches in normal use to additionally absorb shock.

Tubular stops 14 and 16 are secured in the ends of the body 12. The tubular stops are each also circular cylindrical tubes of synthetic polymer composition material, preferably the same material as the body. The tubular stops are secured in place in the ends of the body, such as by adhesive or thermal welding. The left end of the shock absorber 10 is considered to be the snap end.

Exteriorly of the body is a snap hook 18 sized to conveniently snap onto the eye in a dog collar. The snap hook 18 has a hook 20. Finger 22 is pivotally mounted on the body of the hook and is spring-loaded to stop against the hook in the closed position shown in FIGS. 2 and 3. Thus, the snap hook can be snapped onto a ring, such as one on a dog's collar. Swivel connector 24 is mounted on a swivel pin on the end of the snap hook away from the hook. Swivel connector 24 has an opening in its right end which receives connector cap 26.

Figure 6:
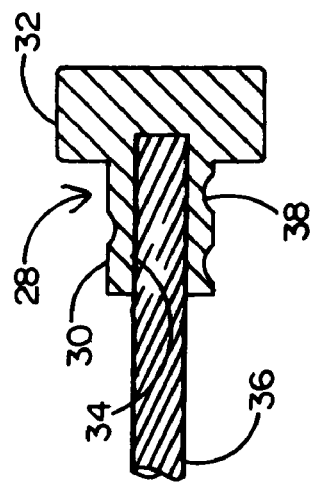
FIG. 6 is an enlarged detail which is a sectional view through the cap attached to the end of the cable.
Figure 5:
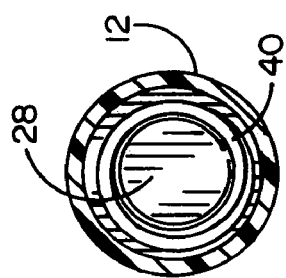
FIG. 5 is an enlarged transverse section taken generally along the line 5-5 of FIG. 2.

The connector cap 26 is similar to the connector cap 28 shown in FIG. 6. The connector cap 28 has a shank 30 and a head 32. The head is much smaller than the inside of the body so that it has no pneumatic effect. The shank has a central opening 34 which is sized to receive the end of cable 36. At least the shank portion of the connector cap 28 is made of malleable material so that it may be crimped or swaged down onto the cable to secure the cap on the cable. Depression 38 is seen in FIG. 6 as representing this malleable distortion which secures the connector cap onto the cable. As seen in FIGS. 2 and 3, the connector cap 26 is secured to the left end of the cable, and the connector cap 28 is secured to the right end of the cable. Compression spring 40 is positioned between connector cap 28 and stop 14. Without sealing therein, the connector cable 36 extends out through clearance hole 37 in the stop 14 where it is engaged in the swivel connector 24.

The cable 36 extends out through the opening in the stop 14 without sealing. The cap 28 is spaced from the interior wall of the tube of body 12 so that there is no significant piston action between the cap 28 and the body. In addition, the fact that the cable 36 is smaller than the opening through the stop 14, there is no pneumatic result. There is no significant increase or decrease of pressure within the tube when the springs are stressed, so there is no pneumatic action. In fact, under tension the cables 36 and 50 are pulled out of the body with the result there is less material within the body so that air would flow in through the openings in the stops, rather than build up pressure. There is no piston action and there is no seal action. Thus, tension on cable 36 causes compression of spring 40.

The ring end of the shock absorber is similar to the snap end. It is called the ring end because it carries an external ring 42 sized to be conveniently engaged by the snap hook on the end of a dog leash. Dog leash 44, shown in FIG. 1, is held by a dog walker 46 who controls dog 48. A flexible tension member in the form of cable 50 is engaged on the ring 42 and extends inward through clearance hole 43 in the tubular stop 16, without sealing, see FIGS. 2, 3 and 4, and through compression spring 52. The ring 42 is attached to the end of cable 50 by means of a connector cap 54, which is the same as connector cap 26. The connector cap 54 is crimped onto the outer end of cable 50. The cable 50 extends through the central opening in stop 60 and through compression spring 52 into the connector cap 56 crimped onto the left end of the cable 50. Both of the springs 40 and 52 are wound so that the end engaged by the connector caps 28 and 56, respectively, are smaller than the principal body of the springs.

The body of spring 52 is the of the same diameter as the body of spring 40. Only the ends adjacent the connector caps need be reduced, and they are only reduced in order to provide a secure contact between the connector cap and the compression spring. The spring 52 has a smaller diameter wire and thus has a lower spring constant (amount of deflection per unit force) as compared to the spring 40, which has a larger diameter and thus less deflection per unit force. The unstressed length of the spring 52 is about twice the unstressed length of the spring 40.

When axial tension is applied between the hook 18 and ring 42, the spring 52 first compresses and becomes solid, while the heavier spring 40 is only half compressed. This means progressive increase of force with the force per unit of spring deflection increasing in rate as the longer spring 52 becomes solid. This extends the range over which the shock absorber 10 is effective. Another important factor in shock absorption is that the body 12 is made of resilient polymer composition material. It also stretches up to 50% under tension to additionally absorb shock. After the two springs are solid, the body continues to stretch under additional load.

Figure 4:
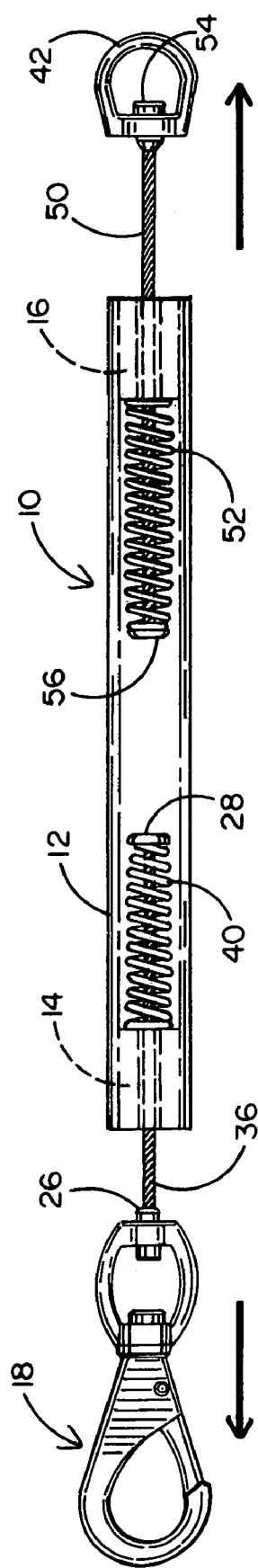
FIG. 4 is a view similar to FIG. 2, showing the shock absorber in the stressed, shock-absorbing position.

FIG. 1 illustrates the use of the shock absorber 10. The dog leash 44 is connected by a snap hook to ring 42. The snap hook 18 of the shock absorber is connected to the dog collar. The dog walker now has the shock absorber 10 between himself and the dog 48. Should the dog give a jerk, the springs 40 and 52 compress. In addition, the resilient body 12 stretches under tensile load. FIG. 4 shows the pulling of the cables 36 and 50 out of the body, with consequent compression of the springs 40 and 52. In this way, the dog walker 46 is protected from sudden shocks.

The substantial convenience of creating the body of the shock absorber out of flexible material is that, with its flexure it will not hurt the dog or the dog walker should it be moved suddenly and strike one or the other. Furthermore, use of polymer material permits the shock absorber to be resilient, strong and lightweight so that it absorbs shock and is less of a burden to carry around.

This invention has been described in its presently preferred embodiment, and it is clear that it is susceptible to numerous modifications, modes and embodiments within the ability of those skilled in the art and without the exercise of the inventive faculty. Accordingly the scope of this invention is defined by the scope of the following claims.

The invention claimed is:

1. A shock absorber for connection to a dog leash, comprising:
an open-ended tubular resilient flexible polymer composition body having first and second ends, said resilient flexible polymer composition body having a co-efficient of elasticity not more than about $2 \times 10^3$, an open tubular spring stop within said open-ended tubular resilient flexible polymer composition body, said spring stop being adjacent said first end of said open-ended tubular resilient flexible polymer composition body;
a compression spring within said open-ended tubular resilient flexible polymer composition body, said spring engaging against said open tubular spring stop within said open-ended tubular resilient flexible polymer composition body;
a flexible tension member having first and second ends, said flexible tension member having said first end attached to said compression spring, said second end of said flexible tension member extending out of said tubular spring stop in said first end of said body without sealing therein;
first attachment structure on said second end of said flexible tension member; and
second attachment structure on said second end of said open-ended tubular resilient flexible polymer composition body so that one of said attachment structures can be attached to a dog collar and the other of said attachment structures can be attached to a dog leash to absorb shock therebetween by both compression of said spring and resilient elongation of said body without air pressure buildup within said body; wherein said spring stop is a first spring stop which is positioned adjacent said first end of said open-ended tubular resilient flexible polymer composition body and there is a second spring stop within said flexible resilient tubular body which is positioned adjacent said second end of said flexible tubular body and said compression spring is a first compression spring and there is additionally a second compression spring, said first compression spring engaging against said first spring stop and second compression spring engaging said second spring stop, said first attachment structure being attached to said first compression spring and said second attachment structure being attached to said second compression spring; and wherein said second attachment structure is attached to said second compression spring by means of a second flexible tension member, both said first and second flexible tension members being first and second metal cables respectively, said first flexible metal cable being attached to said first compression spring by a first connector cap, said second flexible metal cable being attached to said second compression spring by a second connector cap, said first and second connector caps respectively being swaged onto said first and second flexible metal cables.

2. The shock absorber of claim 1 wherein said compression spring has a first end and a second end, said compression spring having its first end engaged against said open tubular spring stop and said first end of said flexible tension member being engaged with said second end of said compression spring.

3. The shock absorber of claim 2 wherein said compression spring has a larger end and a smaller end, said larger end of said compression spring engaging against said open tubular spring stop and said smaller end being engaged by said second end of said flexible tension member.

4. The shock absorber of claim 3 wherein said flexible tension member is a flexible cable and there is a connector cap secured to said flexible cable, said connector cap engaging against said compression spring.

5. The shock absorber of claim 1 wherein said open ended tubular resilient flexible polymer composition body is sufficiently elastic and strong so that it can stretch to 150% of its unstressed length without breaking.

6. The shock absorber of claim 4 wherein there is a connector cap on said second end of said flexible cable where it extends out of said first end of said body and there is a snap hook attached to said connector cap secured to said second end of said flexible cable.

7. The shock absorber of claim 1 wherein said flexible tension member is a flexible cable and there is a connector cap on said first end of said flexible cable where it engages said compression spring and there is a connector cap on said second end of said cable where it extends out of said first end of said body and there is a snap hook attached to said connector cap secured to said second end of said flexible cable.

8. The shock absorber of claim 1 wherein said first attachment structure is a ring and said second attachment structure is a snap hook, said first attachment structure being attached to said first flexible tension member by a connector cap swaged onto said first flexible metal cable and said second attachment structure being attached to said second flexible metal cable by a second connector cap swaged onto said second flexible metal cable.

9. A shock absorber for connection to a dog leash, comprising:
 a body, said body being a tube having first and second ends said to be made of a flexible resilient synthetic polymer material having a co-efficient of elasticity not more than about $2 \times 10^3$, at least said first end of said body being open;
 a first flexible synthetic polymer stop tube secured within said a flexible resilient synthetic polymer material tubular body adjacent said first end of said body;
 a first stop face within said body adjacent said first end, said first stop face being the inner face of said first flexible synthetic polymer stop tube secured within said tubular body;
 a first compression spring within said tubular body engaging against said first stop face;
 a first flexible tension member attached to said first compression spring and extending out through said first stop tube without sealing in said first stop tube so that tension in said tension member compresses said compression spring;
 a first attachment structure on said flexible tension member;
 a second stop face within said body adjacent said second end, said second stop face being the inner face of a second flexible synthetic polymer stop tube secured within said a flexible resilient synthetic polymer material body adjacent said second end of said a flexible resilient synthetic polymer material body;
 a second compression spring within said tubular body engaging against said second stop face;
 a second flexible tension member attached to said second compression spring and extending out through said second stop tube without sealing in said stop tube so that tension in said second tension member compresses said second compression spring;
 said tension members engaging said springs and said tension members extending through said stop tubes in a manner which does not cause an increase in pressure within said tubular body so that pneumatic restraint is absent;
 said second compression spring having a different spring rate than said first compression spring and being configured so that when said first spring is fully compressed, said second spring can be further compressed;
 a second attachment structure attached to said second flexible tension member so that one of said attachment structures can be attached to a dog leash and the other of said attachment structures can be attached to a dog collar so that both said compression springs are compressed with tension on said shock absorber with said first spring compressing at a slower rate than said second spring and said body is stretched to absorb shock.

10. The shock absorber of claim 9 wherein said body is sufficiently resilient so as to also absorb shock when tension is applied to said shock absorber.

11. The shock absorber of claim 10 wherein each of said first and second compression springs has an outer diameter sized to fit within said body and each of said first and second compression springs respectively engages against said first and second stop faces, each of said first and second compression springs having a tapered end which is tapered to a smaller diameter, said tapered end being away from said spring ends engaging said stop faces, said tapered ends of said first and second springs being for enhancement of strength of attachment of said first and second flexible tension members to said first and second springs.

12. The shock absorber of claim 11 wherein each said flexible tension member is a metal cable, each of said first and second metal cables having a connector cap on each end thereof, each said connector caps being swaged onto said flexible tension member for attachment to said attachment structures and engagement on said springs.

* * * * *